C. C. EVANS.
BRAKE.
APPLICATION FILED OCT. 27, 1919.
1,367,128.
Patented Feb. 1, 1921.
Fig. 1.
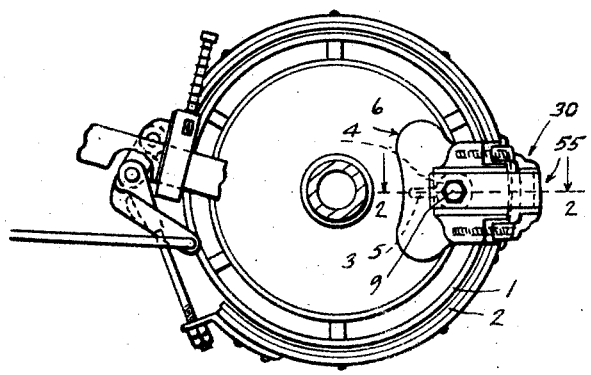
Fig. 5.
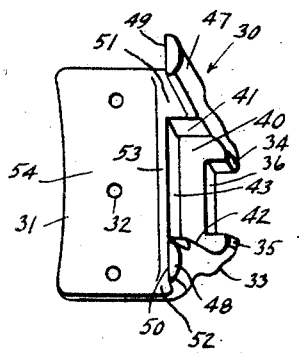
Fig. 2.
Fig. 3.
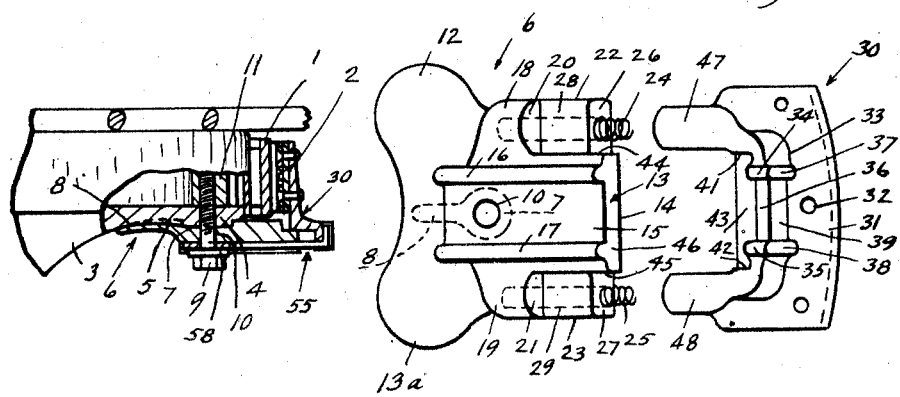
Fig. 4.
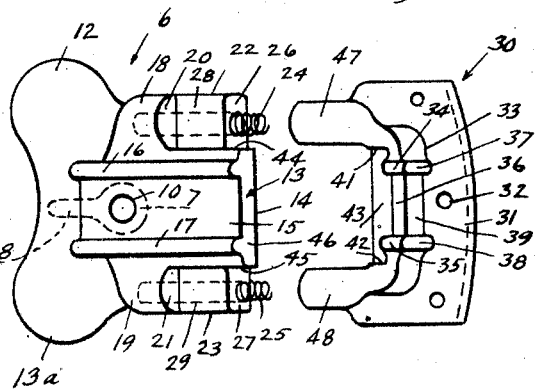
INVENTOR.
C. C. Evans,
BY Hazard & Miller
ATTORNEYS.

UNITED STATES PATENT OFFICE.

CULLEN C. EVANS, OF LOS ANGELES, CALIFORNIA.

BRAKE.

1,367,128. Specification of Letters Patent. Patented Feb. 1, 1921.

Application filed October 27, 1919. Serial No. 333,665.

*To all whom it may concern:*

Be it known that I, CULLEN C. EVANS, a citizen of the United States, residing at Los Angeles, in the county of Los Angeles and State of California, have invented new and useful Improvements in Brakes, of which the following is a specification.

My invention relates to brakes and consists of the novel features herein shown, described and claimed.

My present invention is an improvement upon the invention shown, described and claimed in my patent dated December 19, 1916, No. 1,208,937.

Specifically my object is to improve the spacing mechanism which moves the brake band away from the brake drum when the brake band is released.

Figure 1 is a cross section of a rear axle inside of the brake drum and showing the brake drum and connections in elevation.

Fig. 2 is a fragmentary sectional detail on the line 2—2 of Fig. 1.

Fig. 3 is an enlarged perspective of the spacing mechanism separated to show the detail and ready to be assembled.

Fig. 4 is a perspective of the stop.

Fig. 5 is a perspective of the sliding member shown in Fig. 3, the view being taken from the inside.

In the drawing I have shown a construction suitable for a Ford automobile as heretofore made.

The outer brake drum 1 is engaged by the outer brake band 2. The axle housing flange 3 has a circular boss 4 and a rib 5 extending inwardly from the boss. The supporting plate 6 fits against the axle housing flange 3. The supporting plate 6 has a circular recess 7 in its inner face and a groove 8 extending from the recess 7, the recess 7 and groove 8 fitting the boss 4 and rib 5. The bolt 9 is inserted through the opening 10 at the center of the recess 7 and through the boss 4 and tapped into the inner brake band 11. The supporting plate 6 has wings 12 and 13$^a$ extending in opposite directions from the groove 8 and fitting against the axle housing flange 3 to make a good seat.

The supporting plate 6 has a central portion 13 extending radially to a point beyond the outer brake band 2 and close beside the brake band 2, said central portion 13 having a flat face 14 adjacent to the outer brake band 2 and a face 15 parallel with the face 14 and forming a stop seat and ribs 16 and 17 at the sides of the face 15. Lugs 18 and 19 extend outwardly from the ribs 16 and 17 and have flat outer faces 20 and 21 in a line crosswise of the centers of the ribs 16 and 17.

Spring housings 22 and 23 extend outwardly from the portion 13 in a line transverse of the ribs 16 and 17 and outwardly from the lugs 18 and 19 in a line parallel with the ribs 16 and 17. Expansive coil springs 24 and 25 fit in bores in the spring housings 22 and 23, said bores extending from the extreme outer end faces 26 and 27. Flat faces 28 and 29 are formed upon the spring housings 22 and 23 at right angles to the faces 20 and 21. The central portion 13 having the faces 14 and 15 and the ribs 16 and 17 extend a short distance beyond the faces 26 and 27.

The parts 6 to 29 constitute the rigid member 6. The sliding member 30 coöperates with the rigid member 6.

The attaching plate 31 of sliding member 30 has rivet holes 32 and the inner face of the attaching plate fits against the outer brake band 2 and is secured in place by rivets inserted through the brake band and through the holes 32. A boss 33 extends from the outer face of the inner edge of the attaching plate 32. Lugs 34 and 35 extend inwardly from the boss 33 in line with the ribs 16 and 17, there being a face 36 between the lugs 34 and 35 in line with the face 15. Lugs 37 and 38 extend from the boss 33 at right angles to the lugs 34 and 35, there being a space 39 between the lugs 37 and 38.

A recess extends backwardly from the face 36 and has the face 40 against which the end face of the central portion 13 may strike and has side faces 41 and 42 extending at right angles to the ends of the face 40 and a back face 43 connecting the faces 41 and 42. The face 14 of the rigid member rides against the face 43. The faces 44 and 45 of the central portion 13 ride against the faces 41 and 42 and the end face 46 of the central portion 13 may butt against the face 40.

Arms 47 and 48 extend from the ends of the lug 33 and have flat inner faces 49 and 50 fitting against the faces 28 and 29 of the rigid member. Straight flat faces 51 and 52 extend inwardly from the bases of the arms 47 and 48 and from the faces 49 and 50 and fit against the springs 24 and 25. A straight rib 53 connects the faces 51 and 52 along the side concave face 54 against which the brake band 2 fits. The sliding member 30 thus constructed slides upon the rigid member 6.

The stop 55 is made of heavy strap iron and has a straight flat portion 56 fitting between the ribs 16 and 17 and between the lugs 34 and 35 and has a stop portion 57 bent at right angles to the outer end of the portion 56 and fitting between the lugs 37 and 38. The bolt 9 is inserted through a washer 58, through the inner end of the portion 56, through the opening 10 in the rigid member 6, through the lug 4 of the axle housing flange 3 and screwed into the inner band member 11. This bolt 9 is a substitute for the bolt originally used for holding the inner band member 11.

The sliding member 30 carries the central portion of the outer brake band 2 and will slide inwardly when the brake band is set, and when the brake band is released the springs 24 and 25 will force the sliding member outwardly to move the band 2 away from the drum.

There is only a slight movement between the position of the brake band 2 tight against the drum and the position of the brake band 2 free so as not to bear upon the drum, but it is important that this movement be positive.

In my former patent the slide consisted of two pins sliding in bores and the pins were necessarily short and there is a tendency to bind and wear. In the present construction the face 43 is comparatively large and bears against the face 14, and the faces 49 and 50 are large and wide apart and bear against the faces 28 and 29. The parts are heavy and strong and not liable to wear and not liable to bind. The springs 24 and 25 are well housed and of considerable length and of ample strength to overcome the strain and friction.

Various changes may be made without departing from the spirit of my invention as claimed.

I claim:

1. In a brake, the combination with an axle housing flange and an outer brake band, of a spacing mechanism for moving the brake band outwardly, said spacing mechanism comprising a rigid member adapted to be attached to the axle housing flange and having a central portion extending radially, said central portion having a bearing inner face and there being spring housings extending laterally from the central portion and having bearing outer faces and springs mounted in the spring housings, a sliding member having an attaching plate, a bearing face fitting the inner bearing face of the rigid member and bearing faces fitting the outer bearing faces of the rigid member and seats against which the springs press, and a stop secured to the rigid member to limit the outward movement of the sliding member.

2. In a brake, the combination with an axle housing flange having a circular boss and a rib extending inwardly from the boss and an outer brake band operatively mounted, of a spacing mechanism for moving the brake band outwardly, said spacing mechanism comprising a rigid member fitting the circular boss and rib, said rigid member having a central portion extending radially and forming an inner bearing face and having spring housings extending outwardly from the central portion and forming outer bearing faces, springs in the spring housings, and a sliding member having an attaching plate adapted to be secured to the brake band and having an inner bearing face fitting the inner bearing face of the rigid member and having faces fitting the outer ends of the springs and having bearing faces fitting the outer bearing faces of the spring housings, a stop having a straight flat portion fitting against the outer face of the rigid member and a stop-portion engaging the sliding member to limit its outward movement, and a bolt inserted through the stop and through the rigid member and through the boss of the axle housing flange.

In testimony whereof I have signed my name to this specification.

CULLEN C. EVANS.